United States Patent
Stevens et al.

(10) Patent No.: US 10,493,550 B2
(45) Date of Patent: Dec. 3, 2019

(54) EARTH-BORING TOOLS HAVING PARTICLE-MATRIX COMPOSITE BODIES AND METHODS FOR WELDING PARTICLE-MATRIX COMPOSITE BODIES

(71) Applicant: Baker Hughes, a GE company, LLC, Houston, TX (US)

(72) Inventors: John H. Stevens, The Woodlands, TX (US); Redd H. Smith, Holladay, UT (US); James Andy Oxford, Magnolia, TX (US); Jose Ramirez, Powell, OH (US); Nathan David Ames, Sunbury, OH (US); Shuchi Khurana, Columbus, OH (US)

(73) Assignee: Baker Hughes, a GE company, LLC, Houston, TX (US)

(*) Notice: Subject to any disclaimer, the term of this patent is extended or adjusted under 35 U.S.C. 154(b) by 21 days.

(21) Appl. No.: 15/606,539

(22) Filed: May 26, 2017

(65) Prior Publication Data

US 2017/0266746 A1  Sep. 21, 2017

Related U.S. Application Data

(60) Division of application No. 12/181,998, filed on Jul. 29, 2008, now Pat. No. 9,662,733, which is a
(Continued)

(51) Int. Cl.
*B23K 9/028* (2006.01)
*B23K 9/04* (2006.01)
(Continued)

(52) U.S. Cl.
CPC ............ *B23K 9/0282* (2013.01); *B23K 9/044* (2013.01); *B23K 9/232* (2013.01); *B23K 9/235* (2013.01);
(Continued)

(58) Field of Classification Search
CPC .......... B23K 2101/002; B23K 2103/16; B23K 2103/18; B23K 2103/50; B23K 26/282;
(Continued)

(56) References Cited

U.S. PATENT DOCUMENTS 1,867,345 A 7/1932 Orrin
2,032,328 A 2/1936 Reedy
(Continued)

FOREIGN PATENT DOCUMENTS

CH 334394 1/1959
CN 1369349 A 9/2002
(Continued)

OTHER PUBLICATIONS

Office Action issue by the European Patent Office for Application No. EP 08797 092-7 dated May 20, 2011, 4 pages.
(Continued)

*Primary Examiner* — James G Sayre
(74) *Attorney, Agent, or Firm* — TraskBritt (57) ABSTRACT

Methods for welding a particle-matrix composite body to another body and repairing particle-matrix composite bodies are disclosed. Additionally, earth-boring tools having a joint that includes an overlapping root portion and a weld groove having a face portion with a first bevel portion and a second bevel portion are disclosed. In some embodiments, a particle-matrix bit body of an earth-boring tool may be repaired by removing a damaged portion, heating the particle-matrix composite bit body, and forming a built-up metallic structure thereon. In other embodiments, a particle-matrix composite body may be welded to a metallic body by forming a joint, heating the particle-matrix composite body, melting a metallic filler material forming a weld bead and cooling the welded particle-matrix composite body, metallic filler material and metallic body at a controlled rate.

19 Claims, 8 Drawing Sheets

Related U.S. Application Data continuation-in-part of application No. 11/833,510, filed on Aug. 3, 2007, now abandoned.

(51) Int. Cl.

| | | |
|---|---|---|
| *B23K 9/23* | (2006.01) | |
| *B23K 9/235* | (2006.01) | |
| *B23K 26/34* | (2014.01) | |
| *B23K 35/30* | (2006.01) | |
| *B23K 35/32* | (2006.01) | |
| *B23K 35/36* | (2006.01) | |
| *B23K 35/02* | (2006.01) | |
| *B23K 35/24* | (2006.01) | |
| *C21D 9/50* | (2006.01) | |
| *B23K 26/32* | (2014.01) | |
| *B23K 26/342* | (2014.01) | |
| *B23K 26/282* | (2014.01) | |
| *B23K 26/60* | (2014.01) | |
| *B23K 101/00* | (2006.01) | |
| *B23K 103/16* | (2006.01) | |
| *B23K 103/18* | (2006.01) | |
| *B23K 103/00* | (2006.01) | |

(52) U.S. Cl.
CPC ............ *B23K 26/282* (2015.10); *B23K 26/32* (2013.01); *B23K 26/34* (2013.01); *B23K 26/342* (2015.10); *B23K 26/60* (2015.10); *B23K 35/0244* (2013.01); *B23K 35/24* (2013.01); *B23K 35/3046* (2013.01); *B23K 35/3053* (2013.01); *B23K 35/3066* (2013.01); *B23K 35/327* (2013.01); *B23K 35/3601* (2013.01); *C21D 9/50* (2013.01); *B23K 2101/002* (2018.08); *B23K 2103/16* (2018.08); *B23K 2103/18* (2018.08); *B23K 2103/50* (2018.08)

(58) Field of Classification Search
CPC ...... B23K 26/32; B23K 26/34; B23K 26/342; B23K 26/60; B23K 35/0244; B23K 35/24; B23K 35/3046; B23K 35/3053; B23K 35/3066; B23K 35/327; B23K 35/3601; B23K 9/0282; B23K 9/044; B23K 9/232; B23K 9/235; C21D 9/50; E21B 10/42; E21B 10/54; E21B 2010/564; E21B 10/567

See application file for complete search history.

(56) References Cited

U.S. PATENT DOCUMENTS

| | | |
|---|---|---|
| 2,089,481 A | 8/1937 | Howard |
| 2,376,931 A | 5/1945 | Matson |
| 2,841,687 A | 7/1958 | Richter |
| 3,619,552 A | 11/1971 | Allen et al. |
| 4,156,374 A | 5/1979 | Shwayder |
| 4,165,457 A | 8/1979 | Turcotte |
| 4,296,973 A | 10/1981 | Hartwell |
| 4,306,139 A | 12/1981 | Shinozaki et al. |
| 4,610,320 A | 9/1986 | Beakley |
| 4,628,178 A | 12/1986 | Miyake et al. |
| 4,803,334 A | 2/1989 | Burke et al. |
| 4,837,417 A | 6/1989 | Funk |
| 4,949,511 A | 8/1990 | Endo et al. |
| 5,678,753 A | 10/1997 | Stauder |
| 5,829,539 A | 11/1998 | Newton et al. |
| 6,138,780 A | 10/2000 | Beuershausen |
| 6,191,379 B1 | 2/2001 | Offer et al. |
| 6,310,314 B2 | 10/2001 | Nobauer et al. |
| 6,375,895 B1 | 4/2002 | Daemen |
| 6,392,193 B1 * | 5/2002 | Mallenahalli ........ B23K 9/0216 219/130.01 |
| 6,861,612 B2 | 3/2005 | Bolton et al. |
| 6,972,390 B2 | 12/2005 | Hu et al. |
| 7,861,806 B2 * | 1/2011 | Zahradnik ............ B23K 31/02 175/374 |
| 8,198,565 B2 | 6/2012 | Lu et al. |
| 2003/0121574 A1 | 7/2003 | Brenner et al. |
| 2005/0028897 A1 | 2/2005 | Kurz et al. |
| 2006/0042729 A1 | 3/2006 | Kottlingam et al. |
| 2006/0207803 A1 | 9/2006 | Overstreet |
| 2006/0213693 A1 | 9/2006 | Zahradnik et al. |
| 2006/0278618 A1 | 12/2006 | Forrest et al. |
| 2007/0102198 A1 | 5/2007 | Oxford et al. |
| 2007/0102199 A1 | 5/2007 | Smith et al. |
| 2007/0107942 A1 | 5/2007 | Overstreet et al. |
| 2007/0205023 A1 | 9/2007 | Hoffmaster et al. |
| 2009/0032310 A1 | 2/2009 | Stevens et al. |
| 2009/0032571 A1 | 2/2009 | Smith |

FOREIGN PATENT DOCUMENTS

| | | |
|---|---|---|
| DE | 137334 A | 8/1979 |
| GB | 977731 | 12/1964 |
| JP | 54153745 | 12/1979 |
| JP | 55048478 | 4/1980 |
| JP | 06238474 | 8/1994 |
| JP | 09192839 A | 7/1997 |

OTHER PUBLICATIONS

International Preliminary Report on Patentability for International Application No. PCT/US2008/072075, dated Feb. 9, 2010.

International Search Report for International Application No. PCT/US2008/072075, dated Dec. 9, 2008.

Written Opinion for International Application No. PCT/US2008/072075, dated Dec. 9, 2008.

EP Office Action for EP Application No. 08797092.7 dated Sep. 23, 2010, 4 pages.

\* cited by examiner

EARTH-BORING TOOLS HAVING PARTICLE-MATRIX COMPOSITE BODIES AND METHODS FOR WELDING PARTICLE-MATRIX COMPOSITE BODIES

CROSS-REFERENCE TO RELATED APPLICATIONS

This application is a divisional of U.S. patent application Ser. No. 12/181,998, filed Jul. 29, 2008, now U.S. Pat. No. 9,662,733, issued May 30, 2017, which is a continuation-in-part of U.S. patent application Ser. No. 11/833,510, entitled METHODS AND SYSTEMS FOR WELDING PARTICLE-MATRIX COMPOSITE BODIES, filed Aug. 3, 2007, abandoned, the disclosure of each of which is hereby incorporated herein in its entirety by this reference.

FIELD

The invention relates generally to methods of welding materials susceptible to thermal shock, and to devices resulting from such welding. More particularly, embodiments of the invention relate to methods for welding a particle-matrix composite body to another body. Embodiments of the invention also relate to methods for repairing a particle-matrix composite body of an earth-boring tool. Additional embodiments of the invention include earth-boring tools having a joint between a particle-matrix composite body and a metallic body.

BACKGROUND

Particle-matrix composite materials may be composed of particles embedded in a matrix. For example, relatively hard particles of a carbide ceramic such as tungsten carbide (WC) or titanium carbide (TiC) may be embedded in a matrix of a metal such as cobalt (Co), nickel (Ni), or alloys thereof. These particle-matrix composite materials are used frequently for cutting tools due to improved material properties of the composite as compared to the properties of the particle material or the matrix material individually. For example, in the context of machine tool cutters, refractory carbide ceramic provides a relatively hard cutting surface but is relatively brittle and may not be able to withstand cutting stresses alone, whereas a metal may be too soft to provide a good cutting surface. However, inclusion of the refractory carbide ceramic particles in a more ductile metal matrix may isolate the hard carbide particles from one another and reduce particle-to-particle crack propagation. The resulting particle-matrix composite material may provide a relatively hard cutting surface and improved toughness.

Although particle-matrix composite materials have many favorable material properties, one difficulty in the use of particle-matrix composite materials is that welding using localized heat, such as arc welding, may cause cracks to occur in particle-matrix composite materials.

For example, U.S. Pat. No. 4,306,139 to Shinozaki et al. describes a method for welding a material comprising tungsten carbide and a nickel and/or cobalt binder to an iron base member. Shinozaki et al. discloses that chromium has a strong tendency to combine readily with carbon and will react with the carbon in the tungsten carbide to form carbides of chromium. As a result, the tungsten carbide is decarburized to $(W.Ni)_6C$ or $(W.Co)_6C$, which very frequently appears at the boundary of the material and the weld. These carbides are a few times greater in particle size than tungsten carbide and are very brittle, and can thus cause separation of the weld and cracking. To avoid this problem a nickel-alloy filler material containing no chromium (Cr) and at least 40% nickel by weight is applied with a shielded arc welder or tungsten inert gas welder.

It has been observed however, that welding particle-matrix composite materials (for example, a material comprising tungsten carbide particles in a cobalt matrix) to steel according to Shinozaki et al. may still result in cracking of the particle-matrix composite material proximate the weld.

In view of the above, it would be advantageous to provide methods and associated systems that would enable the welding of a particle-matrix composite material without significant cracking. Additionally, it would be advantageous to provide methods and associated systems that would enable the welding of a particle-matrix composite body to another body using welding techniques involving a focused heat source, such as an electric arc or a laser, without significant cracking resulting in the particle-matrix composite body.

BRIEF SUMMARY

In some embodiments, the invention includes methods in which a particle-matrix composite body of an earth-boring tool is repaired. The method may comprise removing a damaged portion of the particle-matrix composite body to form a work surface thereon. The methods further comprise heating a volume under the work surface to an elevated temperature below the melting temperature of the matrix material of the particle-matrix composite body and heating at least a portion of the volume of the particle-matrix composite body to a second temperature greater than the melting temperature of the matrix material of the particle-matrix composite body. Simultaneously, a metallic filler may be melted to weld the metallic filler to the work surface of the particle-matrix composite body to build up and form a metallic structure thereon. The particle-matrix composite body and built-up metallic structure may be provided at a third temperature and then cooled. Finally, the built-up metallic structure may be machined to form a repair structure.

In additional embodiments, earth-boring tools comprise a joint between a particle-matrix composite body of the earth-boring tool and a metallic body of the earth-boring tool. The joint may include an overlapping root portion and a weld groove having a face portion. The face portion may have a first bevel portion proximate the root portion having a first bevel angle and a second bevel portion having a second bevel angle, the second bevel angle different than the first bevel angle.

In yet additional embodiments, methods of joining particle-matrix composite bodies of earth-boring tools to metallic bodies include forming a joint and heating a volume of the particle-matrix composite body. The joint may be formed to comprise an overlapping root portion and a weld groove having a face portion having a first bevel portion and a second bevel portion. A volume of the particle-matrix composite body may be heated to an elevated first temperature below the melting temperature of the matrix material of the particle-matrix composite body. Then, at least a portion of the volume of the particle-matrix composite body may be heated with a welding torch to a second temperature greater than the melting temperature of the matrix material of the particle-matrix composite body. At this temperature, a metallic filler material may be melted and used to form a weld bead that welds the particle-matrix composite body to the metallic body at an interface therebetween. Finally, the welded particle-matrix composite body, metallic filler material and metallic body may be provided at a third temperature and then cooled at a controlled rate.

DETAILED DESCRIPTION OF THE INVENTION

The depth of subterranean well bores being drilled continues to increase as the number of shallow depth hydrocarbon-bearing earth formations continues to decrease. These increasing well bore depths are pressing conventional drill bits to their limits in terms of performance and durability. Several drill bits are often required to drill a single well bore, and changing a drill bit on a drill string can be expensive in terms of drilling rig time due to the necessity to withdraw or "trip out" thousands of feet of drill pipe to replace a worn drill bit, replace it with a new one, and "trip in" the new drill bit to the bottom of the well bore to resume drilling.

New particle-matrix composite materials are currently being investigated in an effort to improve the performance and durability of earth-boring rotary drill bits. Furthermore, bit bodies comprising at least some of these new particle-matrix composite materials may be formed from methods other than traditional infiltration processes used to form so-called "matrix-type" bits, wherein a mass of hard particles (e.g., tungsten carbide particles) is infiltrated with a molten copper alloy matrix or binder. By way of example and not limitation, bit bodies that include such new particle-matrix composite materials may be formed using powder compaction and sintering techniques. Such techniques are disclosed in U.S. patent application Ser. No. 11/271,153, filed Nov. 10, 2005, now U.S. Pat. No. 7,802,495, issued Sep. 28, 2010, and U.S. patent application Ser. No. 11/272, 439, filed Nov. 10, 2005, now U.S. Pat. No. 7,776,256, issued Aug. 17, 2010, the entire disclosure of each of which application is incorporated herein by this reference. An example of such a rotary drill bit is described further herein.

Figure 1:
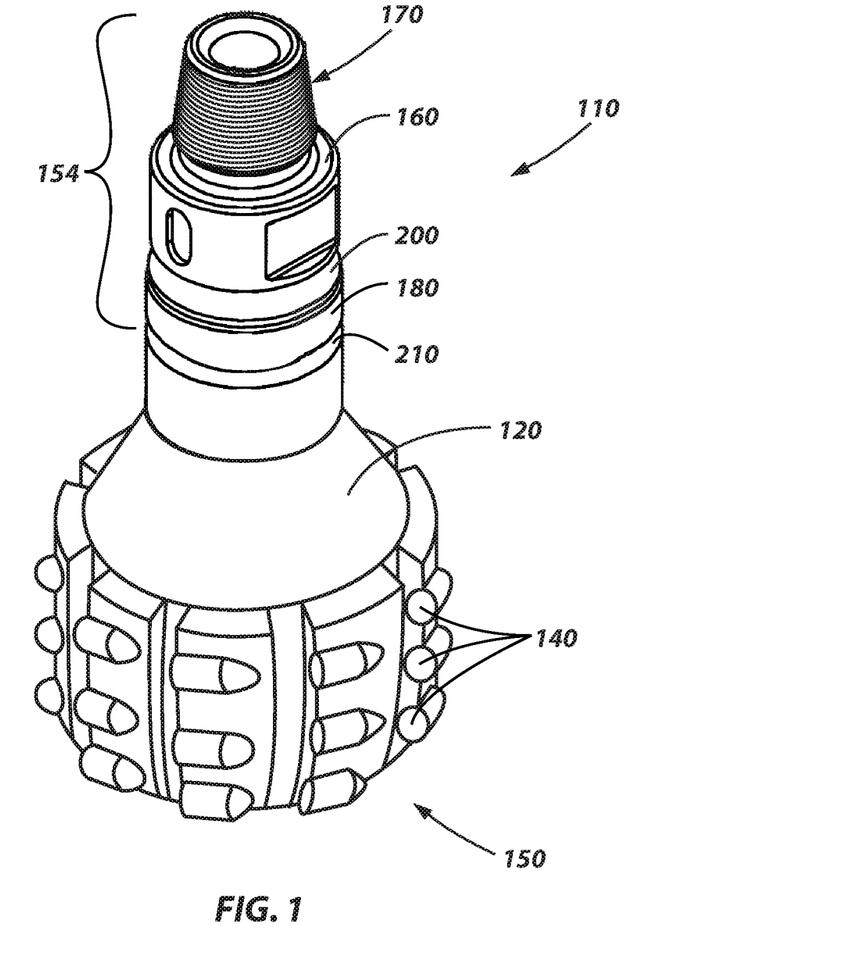
FIG. 1 shows a perspective view of an earth-boring rotary drill bit having a particle-matrix composite bit body welded to a metallic coupler, which includes a shank, according to embodiments of the present invention.
Figure 2:
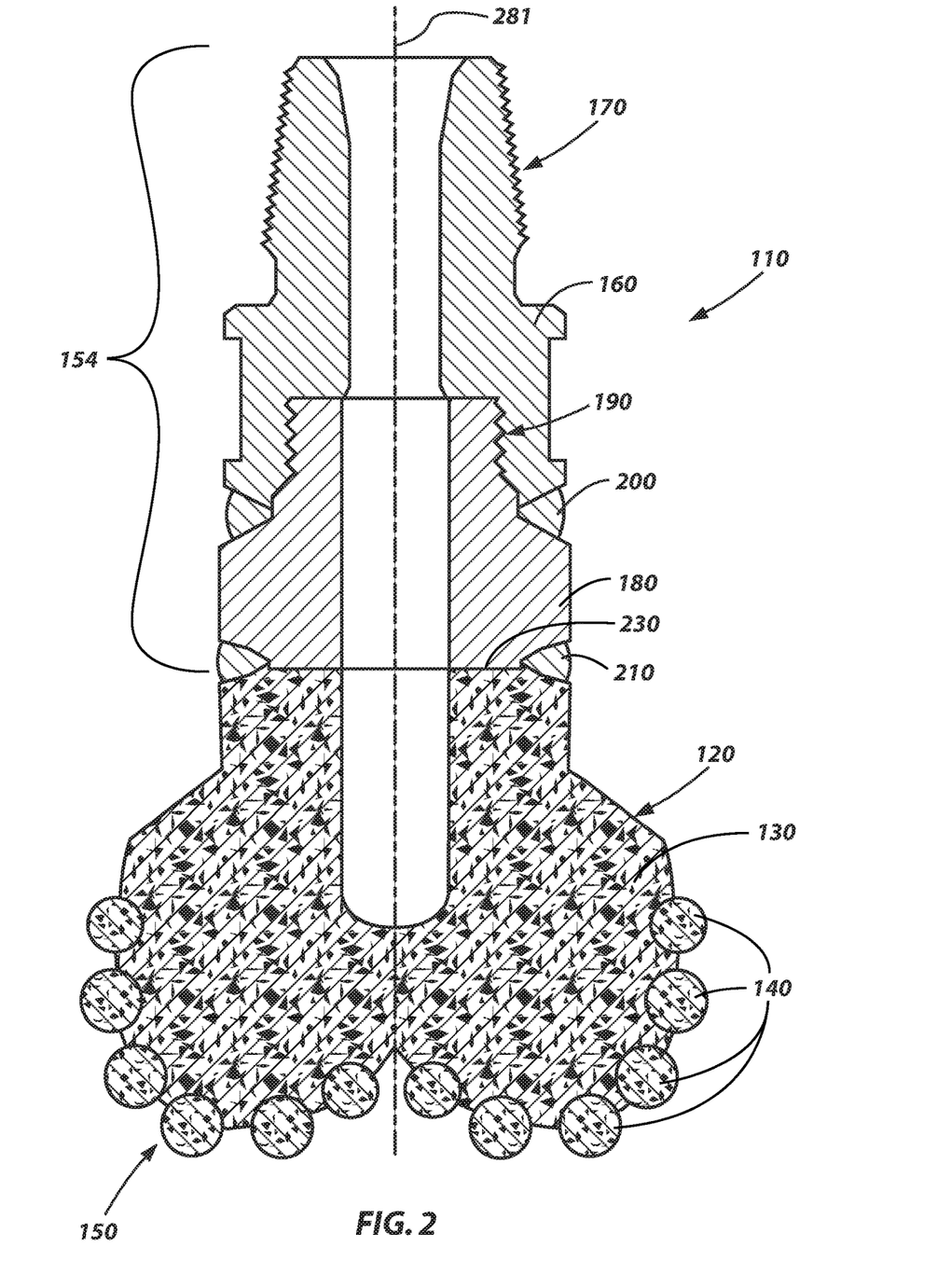
FIG. 2 shows a cross-sectional view of the earth-boring rotary drill bit shown in FIG. 1.

An earth-boring rotary drill bit 110 is shown in FIGS. 1 and 2 that includes a bit body 120 comprising a particle-matrix composite material 130. This example of a rotary drill bit is a fixed-cutter bit (often referred to as a "drag" bit), which includes a plurality of cutting elements 140 secured to the face region 150 of the bit body 120. The bit body 120 is secured to what may be termed a "coupler" (metal coupler 154) for directly or indirectly connecting the rotary drill bit 110 to a drill string or a downhole motor or turbine (not shown). The metal coupler 154 may comprise only a shank 160 or may comprise an assembly that includes both a shank 160 and an extension 180. The shank 160 may have an American Petroleum Institute (API) or other threaded connection 170 and may be formed from a metal such as steel. The bit body 120 may be welded directly to the shank 160 or may be secured to an extension 180, also known as a cross-over, and the extension 180 may be secured to the shank 160, as shown in FIGS. 1 and 2. In some embodiments, the extension 180 may be at least substantially comprised of a similar or the same material as the shank 160. For example, the extension 180 may also comprise steel. The extension 180 may be at least partially secured to the shank 160 by a threaded connection 190 and a weld 200. The extension 180 may be at least partially secured to the bit body 120 by a weld 210 extending around the rotary drill bit 110 on an exterior surface thereof along an interface 230 between the particle-matrix composite bit body 120 and the extension 180. Using conventional welding techniques for forming the weld 210 at the interface 230 may result in unacceptable cracking of the particle-matrix composite bit body 120 proximate the weld 210. However, forming the weld 210 according to an embodiment of the present invention may reduce or eliminate such cracking in the particle-matrix composite bit body 120 that has been observed by the inventors of the present invention when using conventional welding methods.

As noted above, an earth-boring rotary drill bit 110 may include a shank 160, as during drilling operations the drill bit requires attachment to a drill string (not shown). For example, the earth-boring rotary drill bit 110 may be attached to a drill string by threading a steel shank 160 (and the bit body 120 attached thereto) to the end of a drill string by the aforementioned API or other threaded connection 170. The drill string may include tubular pipe and equipment segments coupled end-to-end between the drill bit 110 and other drilling equipment, such as a rotary table or a top drive, at the surface. The drill bit 110 may be positioned at the bottom of a well bore such that the cutting elements 140 are in contact with the earth formation to be drilled. The rotary table or top drive may be used for rotating the drill string and the drill bit 110 within the well bore. Alternatively, the shank 160 of the drill bit 110 may be coupled directly to the drive shaft of a down-hole motor or turbine, which then may be used to rotate the drill bit, alone or in conjunction with surface rotation. Rotation of the drill bit 110 causes the cutting elements 140 to scrape across and shear away the surface of the underlying formation.

Many bit bodies that include a particle-matrix composite material have, as noted above, been termed matrix-type bits and have been fabricated in graphite molds using a so-called "infiltration" process. In this process, the cavity of a graphite mold is filled with hard particulate carbide material (such as tungsten carbide, titanium carbide, tantalum carbide, etc.). A preformed steel blank (not shown) then may be positioned in the mold at an appropriate location and orientation. The steel blank may be at least partially submerged in the particulate carbide material within the mold.

A matrix material (often referred to as a "binder" material), such as a copper-based alloy, may be melted, and caused or allowed to infiltrate the particulate carbide material within the mold cavity. The mold and bit body are allowed to cool to solidify the matrix material. The steel blank is bonded to the particle-matrix composite material that forms the crown upon cooling of the bit body and solidification of the matrix material. A steel shank may then be threaded or otherwise attached to the steel blank and the blank and the shank may be welded together. In other words, it is the steel blank that facilitates connection of the shank to the bit body.

When utilizing new particle-matrix composite materials 130, which may require techniques such as powder compaction and sintering, it may not be feasible to bond a metal coupler 154, such as a steel shank 160, extension 180, or blank, to the particle-matrix composite bit body 120 during the sintering process, as sintering may be conducted at temperatures that exceed the melting temperature of the steel, or other material forming the coupler 154. Additionally, even if the sintering temperature is below the melting temperature of the steel, the temperatures may still be hot enough to alter the microstructure or the steel such that it no longer exhibits desirable physical properties. As such, it may be desirable to bond a metal coupler 154 to the particle-matrix composite bit body 120 after the bit body 120 has been fully sintered.

Figure 3A:
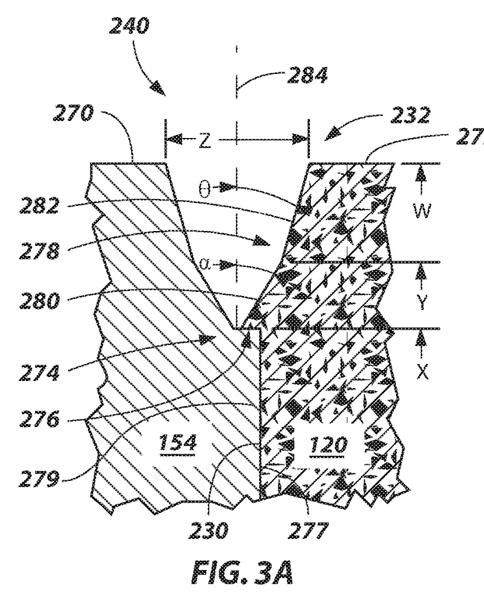
FIG. 3A shows a cross-sectional view of a portion of the interface between the particle-matrix composite bit body and the metallic coupler of the earth-boring rotary drill bit shown in FIG. 1 prior to welding.
Figure 3B:
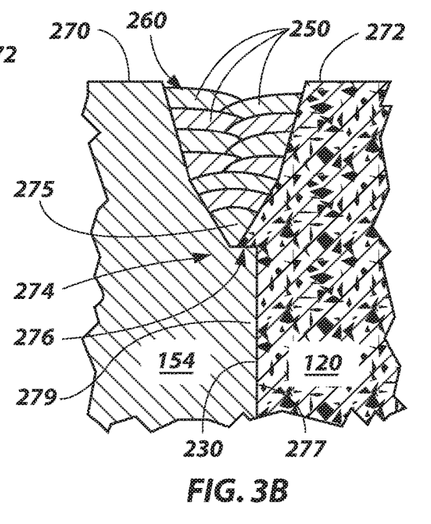
FIG. 3B shows a cross-sectional view of a portion of the interface between the particle-matrix composite bit body and the coupler of the earth-boring rotary drill bit shown in FIG. 1 after welding.

As shown in FIG. 3A, a particle-matrix composite body may abut another body in preparation for welding. For example, a particle-matrix composite bit body 120 and a metal coupler 154 may abut along an interface 230 to form a joint 232. In additional embodiments, a particle-matrix composite body may abut a different metallic body in preparation for welding, including another particle-matrix composite body. The joint 232 may include a weld groove 240 that may be formed along an outer edge of the interface 230. A weld groove 240, which may be a generally V-shaped weld groove 240 as shown in FIG. 3A, may be useful when welding with a filler material 250, as shown in FIG. 3B and as described in more detail herein with reference to FIGS. 5A-5G. The weld groove 240 may allow more surface area of each of the abutting particle-matrix bit body 120 and metal coupler 154 to contact the weld bead 260 formed from the filler material 250 bonded to the material from each of the particle-matrix bit body 120 and metal coupler 154. Additionally, the weld groove 240 may provide a recess for the weld bead 260 so that the weld bead 260 may not protrude substantially beyond the exterior surfaces 270 and 272 of the joined particle-matrix bit body 120 and metal coupler 154. In other embodiments, the weld bead 260 may be formed such that the weld bead 260 extends radially beyond the exterior surfaces 270 and 272, and the weld bead 260 then may be machined (e.g., ground) such that the weld bead 260 is at least substantially flush with the exterior surfaces 270 and 272.

The joint 232 includes an interface 230 and a weld groove 240. The interface 230 comprises an overlapping portion 276 at, or proximate, the root portion 274 of the weld groove 240. The root portion 274 of the weld groove 240 is the portion of the weld groove 240 where the first weld 275, or root weld (shown in FIG. 3B), is formed. Usually, the root portion 274 is the portion of the weld groove 240 that is the greatest distance from the exterior surfaces 270 and 272 of the joined particle-matrix bit body 120 and metal coupler 154. An interface 230 portion may be called an "overlapping" portion 276 when a component of the interface 230 is oriented transverse to the path of the weld groove 240 (as may be observed at a cross-section of the joint 232, such as shown in FIG. 3A). For example, when the weld groove 240 follows an elliptical or circular path having a primary axis 281 (shown in FIG. 2) an interface 230 portion is an "overlapping" portion 276 when a component of the interface 230 is oriented non-perpendicular to the primary axis 281.

In some embodiments, the interface 230 is defined by a portion of one body overlapping a portion of another body in a male-to-female coupling relationship. As shown in FIGS. 3A and 3B, a cavity 277 may be formed in the particle-matrix composite bit body 120 and a corresponding protrusion 279 may be formed on the metal coupler 154 that mates with, or fits within, the cavity 277. The interface 230 may be defined by the mating surfaces of the cavity 277 within the particle-matrix composite bit body 120 and the protrusion 279 formed on the metal coupler 154. Both radial and longitudinal clearances may be provided between the cavity 277 and the protrusion 279 to account for differences in thermal properties therebetween and to avoid inducement of mechanical stresses due to differences in thermal expansion between the bit body 120 and the metal coupler 154.

The weld groove 240 may have a general V-shape, having a face portion 278 with a first bevel portion 280 proximate the root portion 274 and a second bevel portion 282. As shown in FIG. 3A, the face portion 278 of the weld groove 240 may include a first bevel portion 280 oriented at a first bevel angle α and a second bevel portion 282 oriented at a second bevel angle θ, different from the first bevel angle α. The geometry of the joint 232 may be described relative to a reference line 284 that may perpendicularly intersect a major axis of the particle-matrix composite body 120 and a central point of the weld groove 240 opening. A bevel angle may be defined as the smallest relative angle between a bevel surface and the reference line 284. For example, the first bevel portion 280, proximate the root portion 274, may have a bevel angle α of about 25 to about 35 degrees and the second bevel portion 282 may have a bevel angle θ of about 10 degrees to about 20 degrees. As shown in FIG. 3A, the weld groove 240 may have a generally symmetric geometry, wherein the bevel angles α and θ formed in each of the particle-matrix composite bit body 120 and the metal coupler 154 may be generally symmetric.

Figure 4:
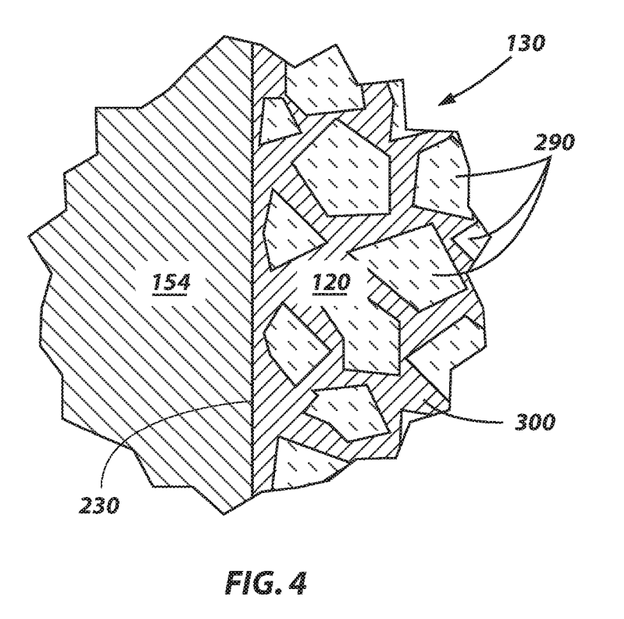
FIG. 4 shows a simplified schematical close-up cross-sectional view of a portion of the interface between the particle-matrix composite bit body and the coupler shown in FIGS. 3A and 3B.

The differences in the materials of the particle-matrix composite bit body 120 and the metal coupler 154 shown in FIGS. 3A and 3B are more clearly illustrated in FIG. 4, which is a simplified schematic showing a close-up cross-sectional view of the interface 230 between the particle-matrix composite bit body 120 and the metal coupler 154.

A particle-matrix composite body, such as the particle-matrix composite bit body 120, may be formed from a particle-matrix composite material 130. The particle-matrix composite material 130 may comprise a plurality of hard particles 290 dispersed throughout a matrix material 300. By way of example and not limitation, the hard particles 290 may comprise a material selected from diamond, boron carbide, boron nitride, aluminum nitride, and carbides or borides of the group consisting of W, Ti, Mo, Nb, V, Hf, Zr, Si, Ta, and Cr, and the matrix material 300 may be selected from the group consisting of iron-based alloys, nickel-based alloys, cobalt-based alloys, titanium-based alloys, aluminum-based alloys, iron and nickel-based alloys, iron and cobalt-based alloys, and nickel and cobalt-based alloys. For example, the particle-matrix composite material may comprise a plurality of tungsten carbide particles in a cobalt matrix. As used herein, the term "[metal]-based alloy" (where [metal] is any metal) means commercially pure [metal] in addition to metal alloys wherein the weight percentage of [metal] in the alloy is greater than or equal to the weight percentage of all other components of the alloy individually.

The metal coupler 154 may comprise a metal material, such as steel.

The present invention recognizes that the cracking of particle-matrix composite materials 130 observed using prior art methods of arc welding may be a result of the difference in the material properties of the particle-matrix composite material 130 and the material of the coupler and the focused heat to which they are subjected to during welding. For example, cracking may occur as a result of thermal shock caused from a localized heat source, such as an electric arc. Particle-matrix composite materials 130 may be especially susceptible to thermal shock due to the brittle nature of the particles 290 in the composite (such as tungsten carbide), and a mismatch between the thermal expansion rates of the different materials, such as the particles 290 and the matrix material 300 of the composite material, the filler material 250 used for welding, and the metal coupler 154.

When an object is heated or cooled, the material of which the object is made will expand or contract. When an object is heated or cooled quickly or when heat is applied to or removed from a specific volume of the object, a temperature distribution or temperature gradient will occur within the object. A temperature gradient will result in some volumes of the material expanding or contracting more than other volumes of the material. As a result of a temperature gradient within the object, thermal stresses may be introduced as different dimensional changes in the object may constrain the free expansion or contraction of adjacent volumes within the object. For example, when an extreme heat is applied at the outer surface of an object the quickly heated volume near the heat source may expand more than the adjacent volumes of the object. This may result in compressive stresses near the heat source balanced by tensile stresses in the adjacent volumes. With quick cooling the opposite may occur, with tensile stresses at the quickly cooled volume of the object and compressive stresses in the adjacent volumes. If these stresses are small enough they may be attenuated by plastic deformation in the material. Ductile materials, such as steel, may experience substantial plastic deformation before fracturing, when compared to brittle materials such as ceramics. Brittle materials may have a very small plastic deformation range; as such they may be more susceptible to fractures as a result of thermal stresses.

The electric arc used in arc welding creates heat focused in a relatively small localized volume of the objects being welded and may cause relatively high temperature gradients within an object as a result. When welding occurs on materials such as steel, the thermal stresses resulting from an applied electric arc may be attenuated by plastic deformation of the steel. However, similar thermal gradients in a particle-matrix composite material 130 may result in thermal stresses that may not be sufficiently attenuated by plastic deformation, and may result in thermal shock of the particle-matrix composite material 130, which may result in fractures in the particle-matrix composite material 130.

Embodiments of the present invention may include one or more of the following techniques or structures, which may reduce thermal stresses throughout the process of welding a metallic material to a particle-matrix composite body: bulk pre-welding heating of the particle-matrix composite body, localized pre-welding heating of the particle-matrix composite body, controlling bulk temperature of the particle-matrix composite body by applying heat and/or insulation to the particle-matrix composite body, controlling the location of the welding torch relative to the particle-matrix composite body and reducing welding passes, a specialized joint design to reduce contact between the localized heat source of the welding torch and the particle-matrix composite material, bulk post-welding heating of the particle-matrix composite body, localized pre-welding and post-welding heating of the particle-matrix composite body, controlled post-welding heat treatment (controlled heating and/or cooling) of the particle-matrix composite body, the use of pulsed wave arc welding techniques when welding the particle-matrix composite body to another material or structure, and the selection and use of a filler material having proper mechanical properties, microstructural stability, and thermal properties, each of which is discussed in more detail herein below.

Some embodiments of the invention may include a bulk pre-welding heating of the particle-matrix composite bit body 120. In some embodiments, the particle-matrix composite bit body 120 may be bulk heated in a furnace 380 (shown in FIGS. 7A and 7B) prior to welding. For example, the particle-matrix composite bit body 120 may be heated in the furnace 380 prior to welding to a temperature in the range of about 374° C. (700° F.) to about 705° C. (1300° F.).

Optionally, the bulk temperature of the particle-matrix composite bit body 120 may be controlled after bulk heating by a thermal insulating material, which may be applied to the particle-matrix composite bit body 120. For example, the particle-matrix composite bit body 120 may be at least partially surrounded by a mineral wool, such as glass wool, rock wool or ceramic fibers after the particle-matrix composite bit body 120 has been heated in the furnace 380. However, the weld groove 240 portion of the particle-matrix composite bit body 120 may remain free of thermal insulating material and exposed to allow the access of a welding torch.

The particle-matrix composite bit body 120 and another body, such as a metal coupler 154, may be joined by a welding process, which may be performed after one or more heating processes. For example, the welding process may be performed after the particle-matrix composite bit body 120 has been bulk heated, such as by the furnace 380, and/or after the particle-matrix composite bit body 120 has been locally heated adjacent the welding torch.

In embodiments of the invention shown in FIGS. 5A-5F, a workpiece 310 comprising a particle-matrix composite body, such as a particle-matrix composite bit body 120, and another body, such as a metal coupler 154, may be joined by a welding process that includes a localized heating of the workpiece 310 adjacent a weld pool 340. Joining a particle-matrix composite bit body 120 to a metal coupler 154 may comprise heating a first localized volume 320 of the particle-matrix composite bit body 120 to an elevated temperature with a heating torch. The elevated temperature may be below the melting temperature of the matrix material of the particle-matrix composite bit body 120. Simultaneously, a second localized volume proximate or adjacent the first localized volume 320 may be heated to a temperature above the melting temperature of the matrix material of the particle-matrix composite bit body 120 with a welding torch forming the weld pool 340. The welding torch may also heat and melt a portion of the metal coupler 154 as well as an optional filler material 250. The melted portion of the particle-matrix composite material 130, which may comprise solid particles suspended in the melted matrix material, and the melted portion of the metal coupler 154 may coalesce and form the weld pool 340 at the interface 230 between the particle-matrix composite bit body 120 and the metal coupler 154. The weld pool 340 may cool to form a weld bead 260, which may join the particle-matrix composite bit body 120 to the metal coupler 154. If an optional filler material 250 is used, the weld pool 340 may also comprise molten filler material, which may coalesce with the melted portion of the particle-matrix composite bit body 120 and the melted portion of the metal coupler 154.

If a filler material is used the filler material 250 may comprise a metal. For example, the filler material 250 may be selected from the group consisting of iron-based alloys, nickel-based alloys, cobalt-based alloys, titanium-based alloys, aluminum-based alloys, iron and nickel-based alloys, iron and cobalt-based alloys, and nickel and cobalt-based alloys. Additionally, the filler material 250 may comprise a material that is used as the matrix material 300 in the particle-matrix composite material 130, or a material that has thermal properties that are similar to the thermal properties of a material used as the matrix material 300. In some embodiments, the filler material 250 may comprise less than 40% by weight nickel. More particularly, the filler material 250 may comprise between about 25% and about 38% by weight nickel. In additional embodiments, the metallic filler material 250 may comprise a combined weight percentage of at least 90% of iron and nickel, such as "NILO® filler metal CF36" available from Special Metals in Huntington, W. Va., having a typical chemical composition of about 36% nickel, about 62% iron, about 0.2% carbon, about 0.4% manganese and about 1.6% niobium. For another example, the metallic filler material 250 may comprise a combined weight percentage of at least 90% of nickel and cobalt, such as "nickel filler metal 61," also available from Special Metals in Huntington, W. Va., which may be supplied according to American Welding Society specification AWS A5.14 (2005).

Joining a particle-matrix composite body, such as a particle-matrix composite bit body 120 of an earth-boring tool, to a metallic body, such as a metal coupler 154, may comprise heating the first localized volume 320 of a particle-matrix composite body with a heating device to an elevated first temperature below the melting temperature of the matrix material. The workpiece 310 may be rotated such that the weld bead 260 is formed along the interface 230 between the particle-matrix composite bit body 120 and the metal coupler 154. As the workpiece 310 moves relative to the heating torch and the welding torch, at least a portion of the localized volume of the particle-matrix composite bit body 120 may be temporarily positioned proximate the welding torch. The welding torch may heat at least a portion of the first localized volume 320 of the particle-matrix composite bit body 120 to a second temperature greater than the melting temperature of the matrix material of the particle-matrix composite bit body 120 to weld particle-matrix composite bit body 120 to the metal coupler 154.

Figure 5A:
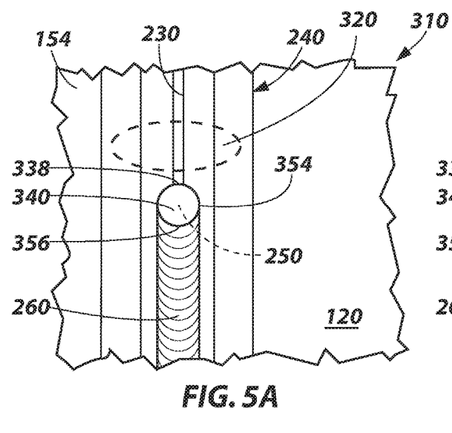
FIGS. 5A-5G show a portion of a side view of the drill bit of FIG. 1 and illustrate the interface between the particle-matrix composite bit body and the steel coupler of FIG. 1 during welding processes.

As shown in FIG. 5A, a heating torch may be used to heat a first localized volume 320 proximate the leading edge 338 of the weld pool 340, as a weld bead 260 is formed along the interface 230. The heating torch may provide heat at the interface 230 between the particle-matrix composite bit body 120 and the metal coupler 154 and may heat a localized volume of each body. The torch may be a fuel/oxygen-type torch that uses a fuel, such as acetylene, propane, hydrogen, or other fuels known in the art, that may be combusted with oxygen, such as the oxygen naturally occurring in air or a supplied substantially pure oxygen. The fuel/oxygen mixture may be adjusted so that the flame may combust all of the reactants (a neutral flame) or the flame may be fuel rich, i.e., having more fuel than can be combusted by the available oxygen (a reducing flame). A neutral or a reducing flame may reduce the oxidization that may occur at the surface of the particle-matrix composite body, the other body, and/or the filler material, which may be especially susceptible to oxidization at elevated temperatures. If a hydrogen-containing fuel is used, it may be desirable to supply excess fuel and, hence, hydrogen to the torch to aid in the removal of any adhering oxides on the particle-matrix composite bit body 120 and the metal coupler 154. If a hydrocarbon fuel such as acetylene is used, a neutral flame, or slightly reducing flame, may be desirable that may result in the combustion of at least substantially all of the oxygen to prevent oxidation of the heated particle-matrix composite bit body 120 and the metal coupler 154.

The size and shape of the localized volume that may be heated by the heating torch may be selectively tailored by selectively tailoring the nozzle configuration and orientation of the torch. For example, the nozzle may be configured to direct a flame in a fanned out or diffused configuration. This may enable a localized volume to be heated that is larger than the portion of the material that may be melted by the welding torch. By heating the localized volume prior to melting the matrix material of a portion of the localized volume of the particle-matrix composite material, the thermal stress experienced by the particle-matrix composite bit body 120 may be reduced. The reduction of thermal stresses may eliminate or reduce thermal shock within the particle-matrix composite bit body 120. Welding according to the present invention may reduce thermal stresses in particle-matrix composite bodies by a slower transition of temperature changes and a thermal gradient that is spread out over a larger volume of material.

The heating torch and the welding torch may be operated simultaneously and may be positioned such that a portion of the localized volume heated by the heating torch may also be heated above the melting temperature of the matrix material by the welding torch. In the embodiment shown in FIG. 5A, the workpiece 310 may be moved relative to the heating torch and the welding torch, such that the heating torch proceeds the welding torch. In this configuration the heating torch may heat the localized volume of the particle-matrix composite material prior to the welding torch melting a portion of the localized volume.

Figure 5B:
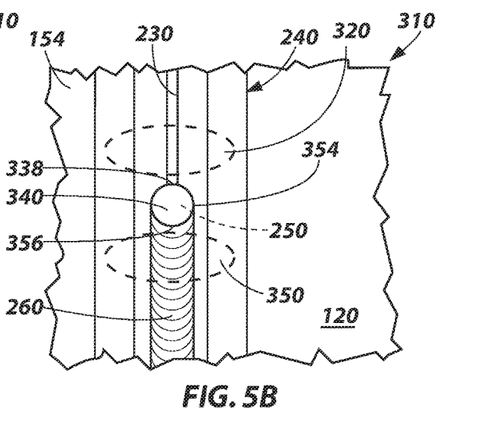
Figure 5C:
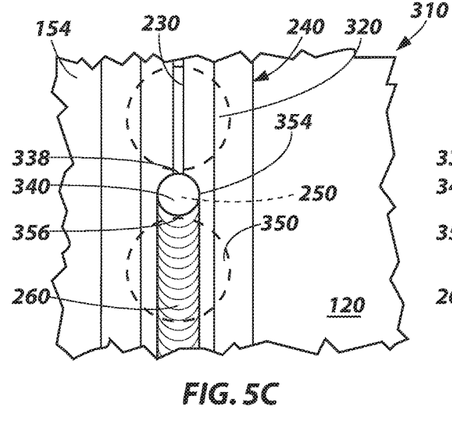
Figure 5D:
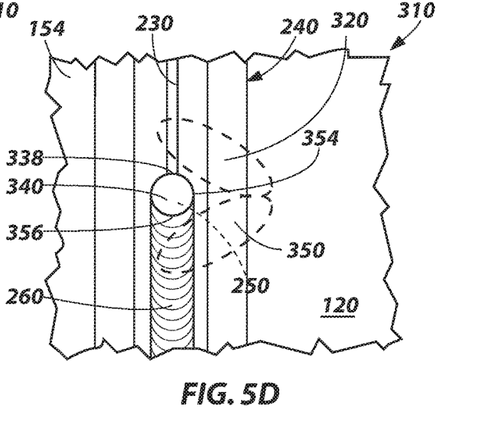

In an additional embodiment, a second heating torch may be operated simultaneously with the first heating torch to provide heat to at least another volume 350 of the particle-matrix composite material, as shown in FIGS. 5B-5D. In this configuration the first heating torch may heat a localized volume of the particle-matrix composite material prior to the welding torch melting a portion of the localized volume, and the second heating torch may provide heat to some or all of the localized volume after welding. By providing heat to the localized volume after creating the weld pool 340, the rate of cooling may be reduced and the temperature gradient within the particle-matrix composite bit body 120 may be spread over a larger volume, which may result in the reduction of thermal stresses in the bit body 120.

In additional embodiments, one heating torch may be used to provide heat to a localized volume after the welding torch has melted a portion of the localized volume to provide a weld without another torch heating the localized volume prior to welding.

Figure 5E:
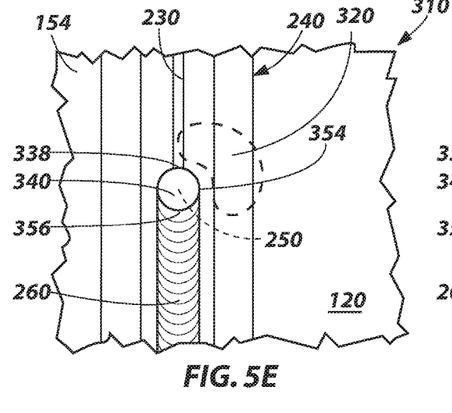
Figure 5F:
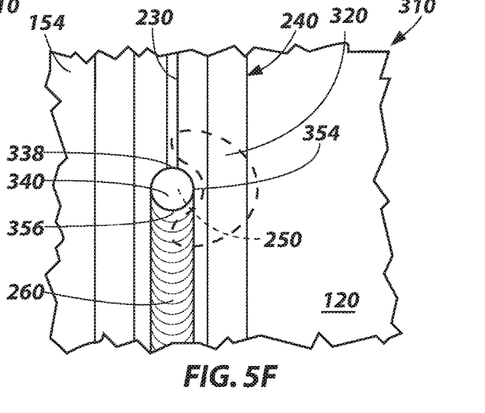

FIGS. 5D-5F show embodiments of the present invention wherein one or more heating torches may provide heat primarily to the particle-matrix composite bit body 120. This configuration may direct the majority of the heat from the one or more heating torches to the particle-matrix composite material while providing less heat to the adjacent material of the coupler 154. If a steel body, such as a metal coupler 154, is welded to a particle-matrix composite body, such as a particle-matrix composite bit body 120, it may be desirable to minimize the heat provided to the steel. Steel components are often manufactured to exhibit desirable physical and chemical characteristics. Certain physical and chemical characteristics, such as the microstructure of the steel, may be affected by heat. For example, the properties of steel may be altered by heat treatment methods such as annealing, case hardening, precipitation strengthening, tempering and quenching. The temperature, chemical environment, and rate of heating and cooling of the steel may be used to affect changes in the physical and chemical properties of the steel. It may be desirable to control the heat provided to a steel body during welding, as excessive heat or uncontrolled heating and cooling rates may have undesirable effects on the properties of the steel. As such, the arrangement of one or more heating torches may be positioned and oriented, and the torch nozzles themselves configured, such that the majority of the heat, or at least substantially all of the heat, from one or more heating torches is directed to the particle-matrix composite bit body 120.

As shown in FIGS. 5E and 5F, a heating torch may be configured to heat a volume of the particle-matrix composite body having a non-uniform shape. The heating torch may heat a volume of the particle-matrix composite material 130 that is proximate or adjacent both the leading edge 338 and a side 354 of the weld pool 340 as shown in FIG. 5E. Additionally, the heating torch may heat a volume of the particle-matrix composite material that is proximate or adjacent both the leading edge 338, a side 354, and the trailing edge 356 of the weld pool 340 as shown in FIG. 5F. The size and shape of the heated volume and location relative to the weld pool 340 may be adjusted, such that a desired heating and cooling rate of the particle-matrix composite bit body 120 may be achieved and/or so that the thermal gradient within the particle-matrix composite bit body 120 may be distributed over a specific volume.

In additional embodiments of the invention, however, one or more heat sources may be used to heat the circumferential regions of the bit body 120 proximate the joint with the metal coupler 154 to a substantially uniform temperature. In other words, the temperature of the bit body 120 proximate the joint with the metal coupler 154 may be at least substantially uniform around the circumference of the bit body 120. Such a uniform temperature may be achieved by rotating the bit body 120 and one or more heat sources relative to one another so as to heat a circumferential region of the bit body 120 to the uniform temperature prior to welding.

Figure 5G:
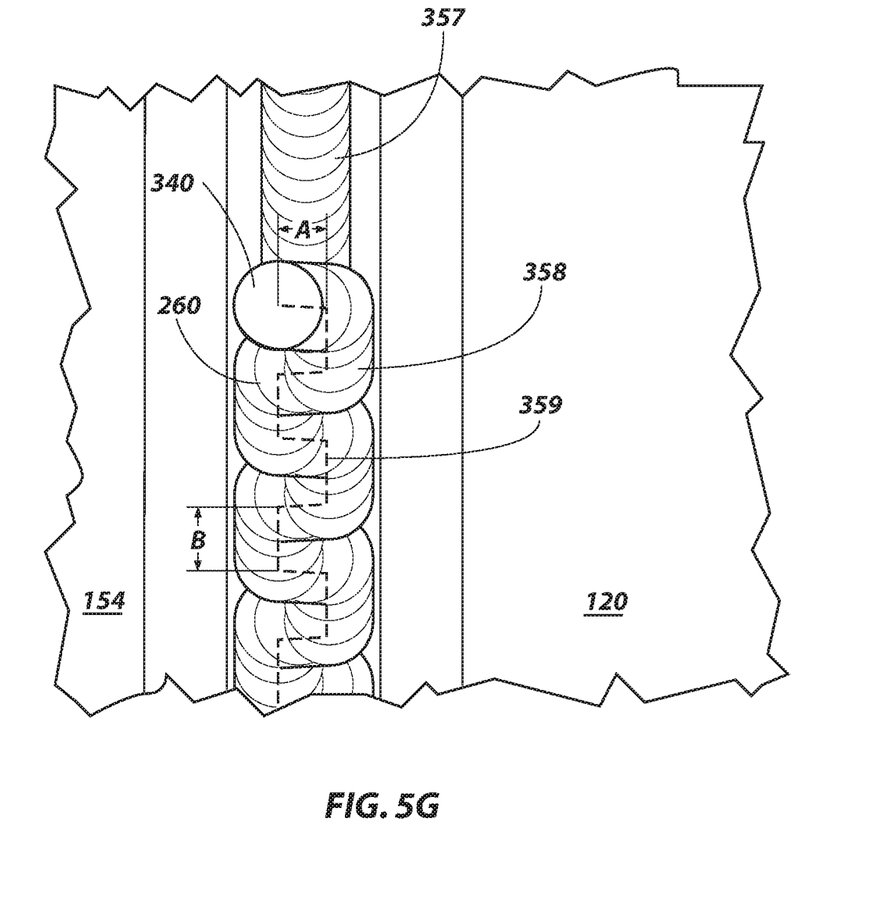

Welding of the particle-matrix composite bit body 120 to the metal coupler 154 may comprise adding filler material 250 in multiple weld passes, as shown in FIG. 5G. A first weld pass or root weld 357, also as shown in FIGS. 5A-5F, may be followed by additional weld passes, such that the weld groove 240 may be filled with filler material 250 in incremental passes of the welding torch within the weld groove 240 and along the interface 230 between the particle-matrix composite bit body 120 and the metal coupler 154. While multiple weld passes may be necessary when using conventional welding torches, it has been found that thermal stress and cracking of the particle-matrix composite material may be reduced by reducing the number of weld passes during the welding process. Additionally, thermal stress and cracking in the particle-matrix composite body may be reduced by avoiding direct contact between the focused heat source of the welding torch, such as an electric arc, and the particle-matrix composite body. For example, the welding torch may be positioned laterally adjacent rather than directly over the particle-matrix composite bit body 120, heating and melting adjacent filler material 250 and the adjacent molten filler material 250 may cause the matrix material of the particle-matrix composite bit body 120 to melt and coalesce with the filler material 250.

After each pass, any oxide material (e.g., an oxide layer) formed over the weld bead 260 comprising the filler material 250 may be removed by, for example, physically removing the oxide material with a wire brush. Removing such oxide material may enhance the bonding of a subsequently deposited weld bead comprising the filler material 250 to the underlying weld bead of filler material 250 from which the oxide material was removed.

In order to reduce welding passes and reduce contact between the focused heat source of the welding torch and the particle-matrix composite bit body 120 a laterally oscillating weave weld 358, such as shown in FIG. 5G, may be used for weld passes after the root weld 357. For example, a flat-topped sawtooth pattern weave weld 358 may be achieved by transverse oscillations of the welding torch relative to the interface 230 and a dwell, or period of maintaining of the transverse position of the welding torch relative to the weld groove 240, at the end of each oscillation. The flat-topped sawtooth pattern weave torch path is indicated by the dashed line 359. The transverse distance A of each oscillation may be called the weave amplitude and the distance B parallel to the interface 230 may be called the dwell. The time that it takes the torch to travel the dwell distance B may be called the dwell time. The time that it takes to complete one cycle of the repeating weave pattern is called the cycle time. A simple formula may be used to correlate the weld travel speed, time and weld bead distance: speed×time=distance. In additional embodiments, the weld 358 could be formed by transversely oscillating the welding torch in a sine wave pattern or any other transversely oscillating pattern.

Figure 7A:
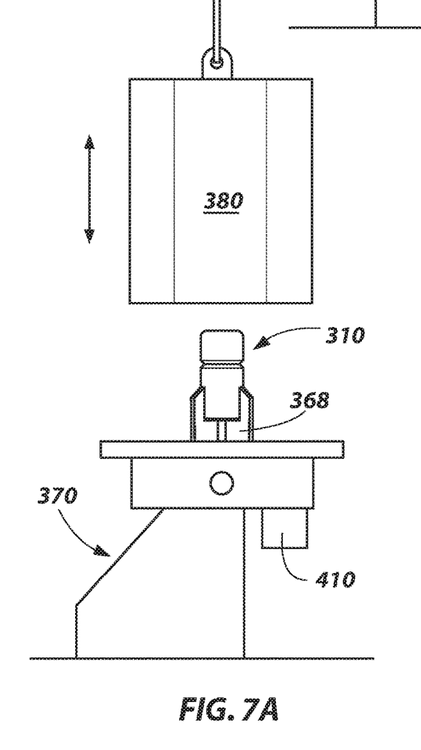
FIGS. 7A-7C show side elevation views of a system for welding a particle-matrix composite body to another body according to embodiments of the present invention.
Figure 7B:
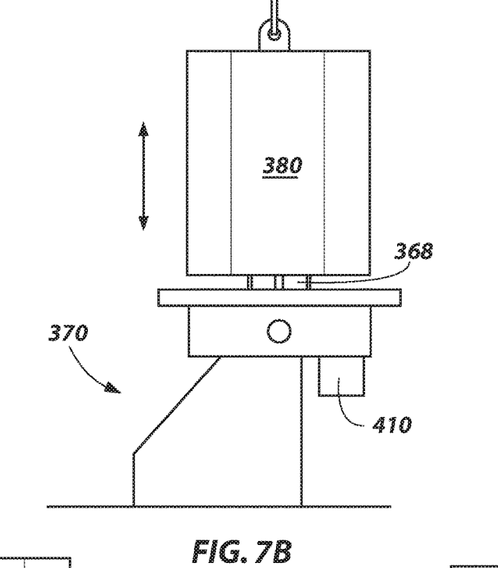

After welding, the particle-matrix composite bit body 120 and the metal coupler 154 may be heated to, cooled to, or other wise provided at another elevated temperature, either by a localized heat source, as discussed with reference to FIGS. 5B, 5C, 5D and 5F herein, or by a bulk post-welding heating of the particle-matrix composite bit body 120. For example, the particle-matrix composite bit body 120 and the metal coupler 154 may be located in a furnace 380 (as shown in FIGS. 7A and 7B) and heated to the elevated temperature. As a non-limiting example, in embodiments in which the metal coupler 154 comprises steel, the welded structure comprising the particle-matrix composite bit body 120 and the metal coupler 154 may be cooled to a temperature below the martensite formation temperature range of the steel, and then the welded structure may be heated to and held at another elevated temperature.

Following welding or post-welding heating, the particle-matrix composite bit body 120 may be cooled at a controlled rate. By controlling the rate of cooling, the heat transfer near the surface of the particle-matrix composite bit body 120 may be reduced, and the thermal gradient within the particle-matrix composite bit body 120 may also be reduced. Reducing the thermal gradient within the particle-matrix composite bit body 120 may reduce the thermal stresses and prevent cracking due to thermal shock. The cooling rate of the particle-matrix composite bit body 120 may be controlled by holding the particle-matrix composite bit body 120 in a controlled temperature environment, such as the furnace 380, which may be gradually reduced. For example, if the particle-matrix composite bit body 120 is bulk heated post-welding in the furnace 380 the particle-matrix composite body 120 may remain in the furnace 380 and the temperature of the furnace 380 may be incrementally reduced over time. Also, the cooling rate may be controlled by at least substantially surrounding the particle-matrix composite bit body 120 with a thermal insulating material (not shown). For example, the particle-matrix composite bit body 120 may be at least substantially surrounded by a mineral wool, such as glass wool, rock wool or ceramic fibers.

In some non-limiting embodiments of the invention, the welding processes described hereinabove with respect to FIGS. 2, 3A, 3B, 4, and 5A-5G may comprise a pulsed-GMAW welding process carried out within the parameter ranges set forth in TABLE 1 below.

TABLE 1

| | | |
|---|---|---|
| Wire Feed Speed | 228-460 | (centimeters per minute) |
| Groove Depth | 0.953-3.175 | (centimeters) |
| Wire Size | 0.089-0.239 | (centimeters) |
| Gas Type | 75% Argon-25% Helium or 100% Argon | |
| Tip-to-Work Distance | 1.27-2.54 | (centimeters) |
| Pulse-GMAW Waveform Parameters — Peak Current | 400-500 | (amperes) |
| Peak Time | 1-3 | (milliseconds) |
| Background Current | 60-70 | (amperes) |
| Background Duration | 2-3 | (milliseconds) |
| Pulse Frequency | 150-300 | (hertz) |
| Mode | Adaptive | |
| Weld Parameters — Number of Weld Passes | 3-20 | |
| Average Current | 100-300 | (amperes) |
| Average Voltage | 21-35 | (volts) |
| Travel Speed | 5.08-38.1 | (centimeters per minute) |
| Weave Cycle Time | 0-6 | (seconds) |

One particular non-limiting example of a method that may be used to weld a particle-matrix composite bit body 120 to a metal coupler 154 according to an embodiment of the invention is described herein below.

A particle-matrix composite bit body 120 was formed by pressing and sintering a powder mixture comprising tungsten carbide particles and cobalt binder particles to form a unitary particle-matrix composite material. The particle-matrix composite bit body 120 was prepared by machining a weld groove surface on the unitary particle-matrix composite bit body 120.

A metal coupler 154 was formed from an American National Standards Institute (ANSI) 8620 steel and was machined to form a weld groove surface complementary to the weld groove surface of the particle-matrix composite bit body 120. The mating weld groove surfaces were designed to form a joint 232 that included a double-bevel weld groove and an overlapping interface proximate the root portion 274 of the weld groove 240 (as shown in FIGS. 3A and 3B). As shown in FIG. 3A the face portion 278 of the weld groove 240 included a first bevel portion 280 having a first bevel angle α of about 30° and a second bevel portion 282 having a bevel angle θ of about 15°. The outer diameter W of the weld groove 240 was about 152 millimeters (mm) (6 inches), the diameter X at the bottom of the weld groove 240 was about 89 mm (3½ inches), and the diameter Y at the transition from the first bevel portion 280 and the second bevel portion 282 was about 114 mm (4½ inches). The outer opening Z of the weld groove 240 was about 25 mm (1 inch).

The weld groove 240 surfaces were cleaned and the assembly was preheated to about 538° C. (1000° F.) in a furnace. The metal coupler 154 and the particle-matrix composite bit body 120 were then at least substantially surrounded with insulating material. The interpass temperature during welding was in the range of about 438° C. (820° F.) to about 482° C. (900° F.).

The particle-matrix composite bit body 120 to metal coupler 154 joint was welded following the parameters shown in TABLE 2 below. The weld was formed in eleven welding passes, including one root pass and ten subsequent weaving passes.

TABLE 2

| Welding pass | Contact-tip-to-work distance (CTWD) in millimeters | Weld travel speed (mm per minute-estimated) | Weave parameters | | |
|---|---|---|---|---|---|
| | | | Weave amplitude (mm) | Weave cycle time (seconds) | Dwell times (seconds) |
| 1 (root) | 19.05 | 381 | N/A | N/A | N/A |
| 2 (weave) | 16.51 | 257 | 1.52 | 0.75 | 0.2 |
| 3 (weave) | 16.51 | 201 | 4.06 | 0.95 | 0.2 |
| 4 (weave) | 16.00 | 180 | 5.08 | 1.20 | 0.5 |
| 5 (weave) | 16.00 | 152 | 6.10 | 1.16 | 0.5 |
| 6 (weave) | 16.00 | 147 | 7.62 | 1.16 | 0.5 |
| 7 (weave) | 16.00 | 135 | 8.38 | 1.25 | 0.5 |
| 8 (weave) | 16.00 | 127 | 9.65 | 1.36 | 0.5 |
| 9 (weave) | 16.00 | 132 | 9.65 | 1.36 | 0.5 |
| 10 (weave) | 16.00 | 137 | 9.65 | 1.36 | 0.5 |
| 11 (weave) | 16.00 | 130 | 15.24 | 2.05 | 0.6 |

A pulsed metal arc welding (PMAW) torch was used with a 1.5 mm (1/16 inch) diameter CF36 Iron-Nickel consumable wire, which was used as the filler material 250. The wire feed speed was set to 457 centimeters per minute (180 inches per minute) and the arch length was about 3 mm (⅛ inch). The pulse waveform parameters were set with a 26 volt (V) to 29 V reference voltage, 470 amperes (A) peak current, 65 A background current, 1.2 millisecond (ms) peak time, 1.0 ms rise time, 2.0 ms fall time, 162 hertz (Hz) frequency, and a 225 A average current. A shielding gas, having a composition of about 75% argon (Ar) and about 25% helium (He), was flowed around the consumable wire through a nozzle having a cup size of about 16 mm (⅝ inch).

The welded assembly was post-weld heated. The assembly was placed in a furnace 380 with an initial temperature setting of 427° C. (800° F.). The temperature of the furnace 380 was raised to 649° C. (1200° F.) in 93° C. (200° F.) to 121° C. (250° F.) increments. The assembly was then held in the furnace 380 at 649° C. (1200° F.) for three hours. The assembly was then cooled in the furnace to 288° C. (550° F.).

The welded joint was inspected by visual examination and dye check evaluation and no cracking was observed.

Figure 6A:
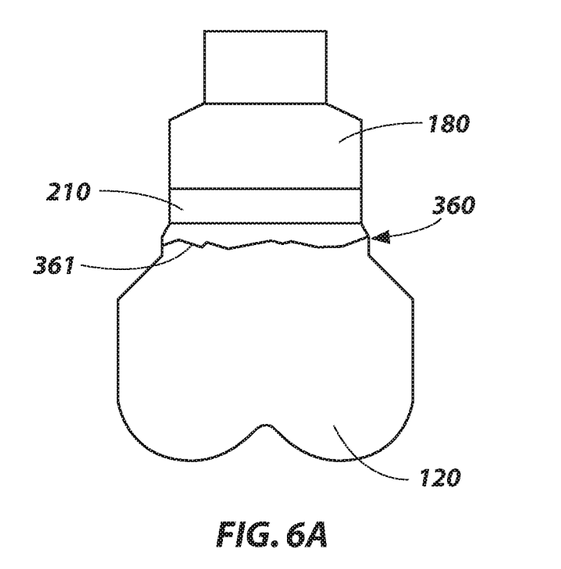
FIGS. 6A-6C show side views of a particle-matrix composite bit crown during a repair process according to embodiments of the present invention.
Figure 6B:
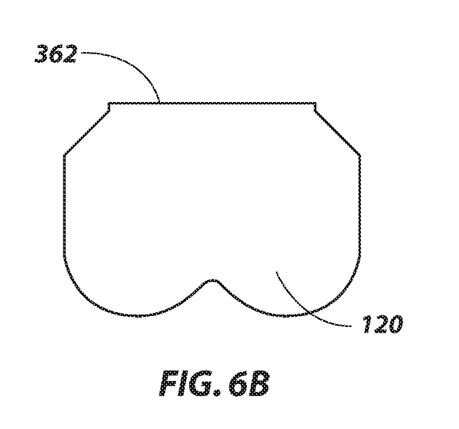
Figure 6C:
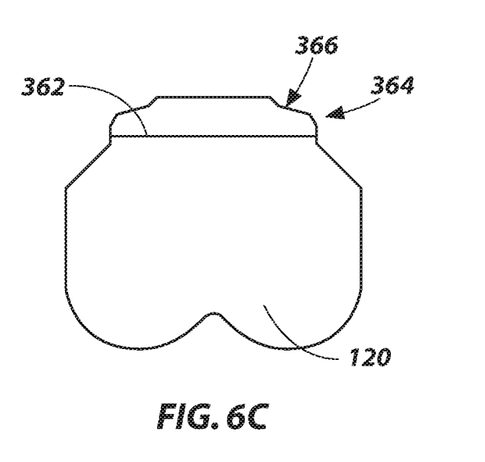

Similar methods to those described hereinabove to join a particle-matrix composite bit body 120 to the metal coupler 154 may also be utilized in methods of repairing a particle-matrix composite body of an earth-boring tool in accordance with embodiments of the present invention, as shown in FIGS. 6A-6C.

A particle-matrix composite body of an earth-boring tool, such as a particle-matrix composite bit body 120, may be repaired by removing a damaged portion 360 of the particle-matrix composite bit body 120 to form a work surface 362 thereon, as shown in FIGS. 6A and 6B. A volume under the work surface 362 of the particle-matrix composite bit body 120 may then be heated to an elevated first temperature below the melting temperature of the matrix material of the particle-matrix composite bit body 120 and at least a portion of the volume of the particle-matrix composite bit body 120 may then be heated to a second temperature greater than the melting temperature of the matrix material of the particle-matrix composite bit body 120 and melting a metallic filler material 250 to weld the metallic filler material 250 to the work surface 362 of the particle-matrix composite bit body 120 to form a built-up metallic structure 364 thereon. The particle-matrix composite bit body 120 and built-up metallic structure 364 may be heated to a third temperature and then may be cooled at a controlled rate. The built-up metallic structure 364 may then be machined to form a repair structure 366, as shown in FIG. 6C.

In one example, the particle-matrix composite bit body 120 may have a crack 361 proximate a weld 210 joining the particle-matrix composite bit body 120 to a metal extension 180, as show in FIG. 6A. The damaged portion 360 of the particle-matrix composite bit body 120 may be removed by cutting or grinding the particle-matrix composite bit body 120 with a superhard material. For example, the particle-matrix composite bit body 120 may be cut with a band saw blade (not shown) comprising superhard materials, such that a generally planar working surface 362 may be formed on the particle-matrix composite bit body 120, such as shown in FIG. 6B. In additional embodiments, the damaged portion 360 of the particle-matrix composite bit body 120 may be removed by grinding or by electric discharge machining (EDM), such as wire EDM (not shown). This may remove portions of the particle-matrix composite bit body 120 that may include cracks or other defects that may compromise the strength or other desirable properties of the particle-matrix composite bit body 120 of the earth-boring tool. Additionally, material may be removed so that a generally planar or other geometric work surface 362 may be formed, as a work surface 362 having a predefined or selected shape or geometry may facilitate welding using an automated and/or computer controlled welding apparatus.

A volume under the work surface 362 of the particle-matrix composite bit body 120 may be heated to an elevated first temperature below the melting temperature of the matrix material of the particle-matrix composite bit body 120 using methods such as described herein to join a particle-matrix composite body to another body. For example, the particle-matrix composite body may be bulk heated in a furnace 380 (shown in FIGS. 7A and 7B) to a temperature in the range of about 371° C. (700° F.) to about 649° C. (1200° F.). In additional embodiments, a localized volume of the particle-matrix composite bit body 120 may be heated to an elevated first temperature below the melting temperature of the matrix material of the particle-matrix composite bit body 120. For example, a localized volume of the particle-matrix composite bit body 120 may be heated to an elevated first temperature below the melting temperature of the matrix material of the particle-matrix composite bit body 120 by heating the localized volume of the particle-matrix composite bit body 120 with one of an oxygen-fuel torch, an electric arc, a plasma arc process, a laser beam, an electron beam, a natural gas flame, an inductor, or a resistive heating system.

If pre-weld heating of the particle-matrix composite bit body 120 is performed in the furnace 380, the particle-matrix composite bit body 120 may be removed from the furnace 380 prior to welding and the temperature of the particle-matrix composite bit body 120 may be lower just prior to welding than when initially removed from the furnace 380. For example, if the particle-matrix composite bit body 120 is bulk heated in the furnace 380 to a temperature in the range of about 371° C. (700° F.) to about 649° C. (1200° F.) the interpass temperature, or the lowest temperature of the material to be welded just prior to welding, may be in the temperature range of about 427° C. (800° F.) to about 538° C. (1000° F.).

After the filler material 250 has been welded to the particle-matrix composite bit body 120 and used to form the built-up metallic structure 364, the particle-matrix composite bit body 120 and the built-up metallic structure 364 may be cooled to, heated to, or otherwise provided at a third temperature and then may be cooled at a controlled rate. For example, the particle-matrix composite bit body 120 and built-up metallic structure 364 may be heated by locating the particle-matrix composite bit body 120 and built-up metallic structure 364 in the furnace 380 with an internal temperature of about 593° C. (1100° F.) to about 705° C. (1300° F.) and holding the temperature of the furnace 380 for at least two hours. After heating the particle-matrix composite bit body 120 and built-up metallic structure 364 in the furnace 380, the particle-matrix composite bit body 120 and built-up metallic structure 364 may be cooled within the furnace 380 at a controlled rate to a temperature of about 120° C. (250° F.) to about 149° C. (300° F.). For example, the controlled rate of cooling may be between about 28° C. (about 50° F.) per hour and about 50° C. (about 90° F.) per hour.

Figure 7C:
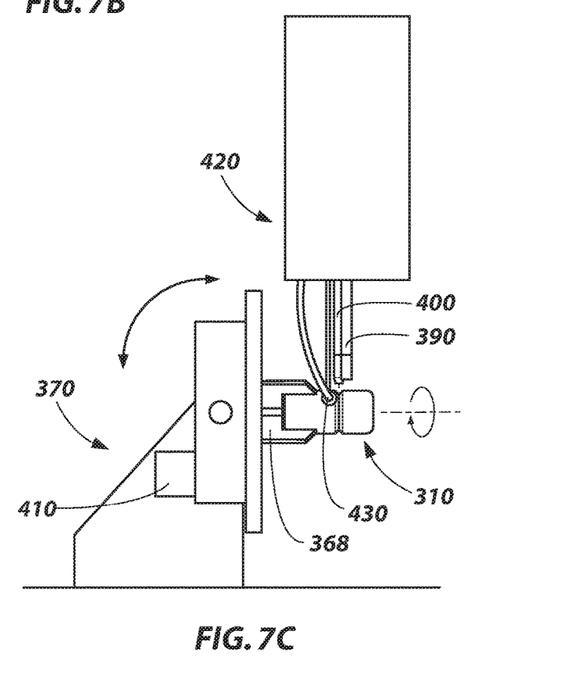

FIGS. 7A-7C show an embodiment of a system for welding a particle-matrix composite body. The system may include a chuck 368 configured to hold a particle-matrix composite body. The chuck 368 is mounted for rotation between a vertical position and a horizontal position on a support structure 370. The system may also include a furnace 380 configured to receive the particle-matrix composite body, as shown in FIGS. 7A and 7B, as well as a heating torch 390 and a welding torch 400 mounted adjacent the heating torch 390, as shown in FIG. 7C. Additionally, the system may include a drive 410, such as an electric motor or a hydraulic motor mechanically coupled to the chuck 368, for rotating the chuck 368 and the particle-matrix composite body during operation of the heating torch 390 and the welding torch 400.

In some embodiments of the invention, the system shown in FIGS. 7A-7C may be automated, and may comprise a computer system (e.g., a desktop or laptop computer or a programmable logic controller) (not shown) that is configured under control of a computer program to automatically operate the various operable components of the system.

As shown in FIG. 7A, a workpiece 310 may be mounted in the chuck 368. The workpiece 310 may comprise a particle-matrix composite bit body 120 (FIG. 1) that may be mounted directly in the chuck 368 or may be mounted to the chuck 368 by another body, such as a metal coupler 154 (FIG. 1) that may be mounted in the chuck 368 and attached to the particle-matrix composite bit body 120. The chuck 368 and the particle-matrix composite bit body 120 may be positioned below a bottom-loading furnace 380. The bottom-loading furnace 380 may be mounted to an overhead structure, such as an overhead crane (not shown), and may be lowered over the particle-matrix composite bit body 120, as shown in FIG. 7B. The furnace 380 may heat the particle-matrix composite bit body 120 to an elevated temperature. For example, the furnace 380 may heat an outer surface or at least substantially all of the particle-matrix composite bit body 120 to a temperature of about 371° C. (700° F.) to 649° C. (1200° F.). After the particle-matrix composite bit body 120 has been heated to a desired temperature, the furnace 380 may be lifted off of the particle-matrix composite bit body 120, such as shown in FIG. 7A. The chuck assembly may be rotated approximately 90°, as shown in FIG. 7C, and a welding assembly 420 may be positioned over the particle-matrix composite bit body 120. For example, the support structure 370 may be configured to facilitate the movement of the chuck 368 from a vertical orientation (shown in FIGS. 7A and 7B) to a horizontal orientation (shown in FIG. 7C).

Figure 8:
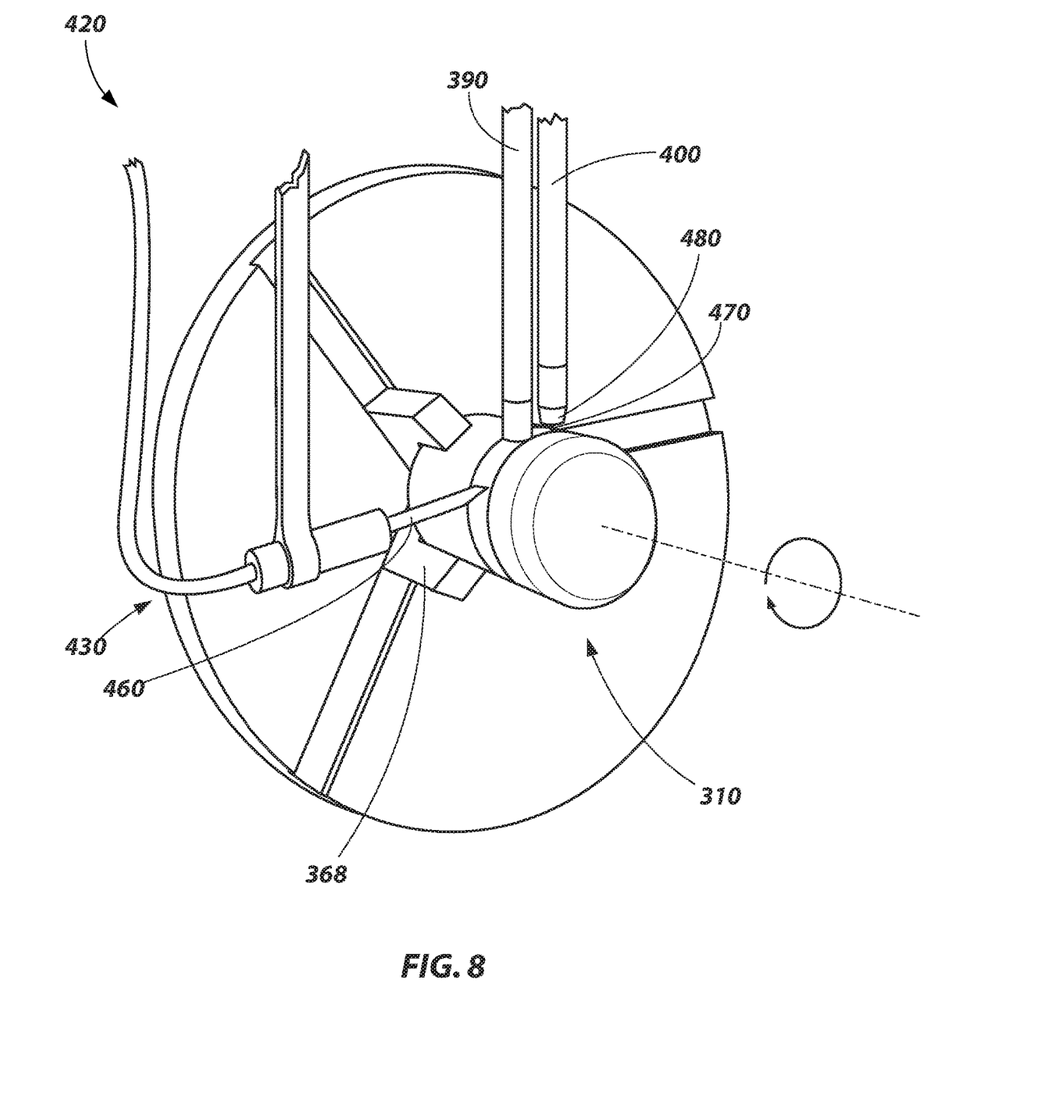
FIG. 8 shows a perspective view of a portion of the system depicted in FIGS. 7A-7C in the orientation shown in FIG. 7C.

The welding assembly 420 is shown in more detail in FIG. 8. The welding assembly 420 may include at least one heating torch 390, a welding torch 400, and a seam tracker 430. The chuck 368 and the particle-matrix composite bit body 120 (FIG. 1) may be rotated about a horizontal axis relative to the welding assembly 420, as indicated in FIGS. 7C and 8. If arc welding is used for welding the particle-matrix composite bit body 120 to the metal coupler 154, a ground (not shown) may be electrically coupled to the workpiece 310 to facilitate forming an electric arc between the electrode and the workpiece 310.

The welding torch 400 and the heating torch 390 may be movable relative to the workpiece 310 as the workpiece 310 is rotated, such that multiple weld passes may be made and the resulting weld bead 260 may be distributed over a region proximate the interface 230 (FIG. 3B) between the particle-matrix composite bit body 120 and the other body.

The welding torch 400 may be a welding torch operable in accordance with one of many welding methods including, but not limited to: gas metal arc welding, gas metal pulse arc welding, shielded metal arc welding, flux-cored arc welding, gas tungsten arc welding, submerged arc welding, plasma arc welding, atomic hydrogen welding, carbon arc welding, oxygen acetylene welding, oxygen hydrogen welding, laser beam welding, electron beam welding, laser-hybrid welding, induction welding, or any combination of such welding methods. If gas metal arc welding (GMAW) is used (also known as metal inert gas (MIG) welding), or if gas tungsten arc welding (GTAW) is used (also known as tungsten inert gas (TIG) welding), an inert gas storage vessel (not shown) may be fluidly coupled to the welding torch 400. The inert gas, such as argon, may be directed around a consumable electrode 470 and act as a shielding gas to provide an at least substantially oxygen-free environment near the electric arc. An at least substantially oxygen-free environment may prevent oxidation of the metals at high heats, such as those created by the electric arc between the consumable electrode 470 and the workpiece 310. The consumable electrode 470 may comprise a metal wire that may be fed through the welding tip 480 from a spool (not shown), and may provide a filler material 250 (FIG. 3B) to the weld.

The heating torch 390 may comprise any of several types of heating torches, including, but not limited to, an oxygen-fuel torch, such as an oxygen acetylene torch and/or an oxygen hydrogen torch, a natural gas torch, a laser beam, an electron beam, and an inductor. If the heating torch 390 comprises an oxygen-fuel torch, an oxygen storage vessel and a fuel storage vessel (not shown) may each be fluidly coupled to the heating torch 390. For example, the fuel may be hydrogen, or may be a hydrocarbon fuel such as acetylene or propane. The oxygen provided may be oxygen naturally found in air, or it may be at least substantially pure oxygen. The nozzle of the oxygen-fuel torch may be oriented such that if an inert shielding gas is used with the welding torch, the gases and flame from the heating torch may not substantially disturb the inert shielding gas proximate the welding torch 400.

A seam tracker 430 may be used that includes a positioning system (not shown) to control the position of the welding torch 400 and/or the heating torch 390 relative to the interface 230 between the particle-matrix composite bit body 120 (FIG. 3A) and the other body. For example, the seam tracker 430 may comprise a probe 460 that may be deflected upon contact with the workpiece 310 and the seam tracker 430 may provide data to the positioning system indicating presence of the workpiece 310 to initiate welding and rotation of the workpiece 310. The probe 460 may drag along the surface of the workpiece 310, and the seam tracker 430 may provide data to the positioning system to indicate surface variations so that the positioning system may generally maintain the welding torch 400 and the heating torch 390 at a specified distance from the surface of the workpiece 310, and may generally maintain the position of the welding torch 400 and the heating torch 390 proximate the interface 230 as the workpiece 310 is rotated relative to the welding assembly 420. In additional embodiments an optical or laser seam tracker (not shown) may be used. An optical or laser seam tracker may not require a mechanical probe to contact the surface of the workpiece 310, but rather may sense the location of the workpiece 310 relative to the seam tracker 430 using an optical sensor and a laser.

The welding assembly 420 may include any number of heating torches 390, such that the welding assembly 420 may be operated to weld as previously described herein with reference to FIGS. 5A-5G, or in any number of other suitable configurations.

In additional embodiments of the present invention, embodiments of welding systems of the present invention may comprise an automated robot such as, for example, a robotic arm having a welding head or torch thereon, configured under control of a computer program to perform the welding processes described hereinabove. In some such embodiments, three or more axes of movement (e.g., between three and seven axes of movement) may be provided between the welding head or torch and the work piece or pieces being welded by the welding head or torch.

In light of the above disclosure it will be appreciated that the devices and methods depicted and described herein enable effective welding of particle-matrix composite materials. The invention may further be useful for a variety of other applications other than the specific examples provided. For example, the described systems and methods may be useful for welding and/or melting of materials that are susceptible to thermal shock. In other words, although embodiments have been described herein with reference to earth-boring tools, embodiments of the invention also comprise methods of welding other bodies comprising particle-matrix composite materials.

While the invention may be susceptible to various modifications and alternative forms, specific embodiments of which have been shown by way of example in the drawings and have been described in detail herein, it should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. An earth-boring tool comprising:
   a joint between a particle-matrix composite body of the earth-boring tool and a metallic body of the earth-boring tool, the joint comprising:
   a generally v-shaped weld groove having a face portion on at least one side thereof, the face portion having a first bevel portion proximate a radially innermost root portion of the weld groove and having a first bevel angle with respect to a reference line perpendicular to a major axis of the particle-composite body and a second, contiguous bevel portion having a second, smaller bevel angle with respect to the reference line; and
   an interface portion at least proximate the root portion wherein a portion of the particle-matrix body and a portion of the metallic body axially overlap.

2. The earth-boring tool of claim 1, wherein the first bevel angle is about 30 degrees and wherein the second bevel angle is about 15 degrees.

3. The earth-boring tool of claim 1, wherein the particle-matrix composite body comprises a sintered particle-matrix composite material.

4. The earth-boring tool of claim 3, wherein the sintered particle-matrix composite material comprises hard particles selected from the group consisting of diamond, boron carbide, boron nitride, aluminum nitride, carbides of the group consisting of W, Ti, Mo, Nb, V, Hf, Zr, Si, Ta, and Cr, and borides of the group consisting of W, Ti, Mo, Nb, V, Hf, Zr, Si, Ta, and Cr, and matrix material selected from the group consisting of iron-based alloys, nickel-based alloys, cobalt-based alloys, titanium-based alloys, aluminum-based alloys, iron- and nickel-based alloys, iron- and cobalt-based alloys, and nickel- and cobalt-based alloys.

5. The earth-boring tool of claim 1, wherein the first bevel portion has a bevel angle between about 25 and about 35 degrees and the second bevel portion has a bevel angle between about 10 and about 20 degrees.

6. The earth-boring tool of claim 1, wherein the portion of the particle-matrix composite body overlaps the portion of metallic body proximate the root portion of the groove and an adjacent surface of the metallic body forms a bottom surface of the weld groove at the root portion.

7. The earth-boring tool of claim 1, further comprising a metallic filler material located within the weld groove and welded to opposing surfaces of the weld groove, including the face portion of the weld groove.

8. The earth-boring tool of claim 7, wherein the metallic filler material comprises nickel.

9. The earth-boring tool of claim 8, wherein the metallic filler material comprises a combined weight percentage of at least 90% of iron and nickel or a combined weight percentage of at least 90% of nickel and cobalt.

10. The earth-boring tool of claim 1, wherein:
    the portion overlapping interface comprises a portion of the particle-matrix composite body overlapping a portion of the metallic body in a male-to-female coupling relationship, wherein a protrusion on the metallic body fits within a cavity in the particle-matrix composite body.

11. The earth-boring tool of claim 1, further comprising:
    a root weld bead located within the weld groove proximate the root portion; and
    at least one oscillating weld bead formed over the root weld bead.

12. The earth-boring tool of claim 1, further comprising a face portion on both opposing sides of the weld groove.

13. The earth-boring tool of claim 12, wherein the weld groove comprises a generally symmetric geometry and the first and second bevel angles of each face portion are generally symmetric.

14. The earth-boring tool of claim 12, wherein the first bevel angle is about 30 degrees and wherein the second bevel angle is about 15 degrees.

15. The earth-boring tool of claim 12, wherein the particle-matrix composite body comprises a sintered particle-matrix composite material.

16. The earth-boring tool of claim 12, wherein the first bevel portion has a bevel angle between about 25 and about 35 degrees and the second bevel portion has a bevel angle between about 10 and about 20 degrees.

17. The earth-boring tool of claim 12, wherein the portion of the particle-matrix composite body overlaps the portion of metallic body proximate the root portion of the groove and an adjacent surface of the metallic body forms a bottom surface of the weld groove at the root portion.

18. The earth-boring tool of claim 12, further comprising a metallic filler material comprising nickel located within the weld groove and welded to opposing surfaces of the weld groove, including the face portion of the weld groove.

19. The earth-boring tool of claim 18, wherein the metallic filler material comprises a combined weight percentage of at least 90% of iron and nickel or a combined weight percentage of at least 90% of nickel and cobalt.

* * * * *